United States Patent
Fukasawa

(10) Patent No.: US 9,424,497 B2
(45) Date of Patent: Aug. 23, 2016

(54) PRINTER SYSTEM

(71) Applicant: FUJI XEROX CO., LTD., Tokyo (JP)

(72) Inventor: Hajime Fukasawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 14/614,488

(22) Filed: Feb. 5, 2015

(65) Prior Publication Data

US 2016/0078325 A1    Mar. 17, 2016

(30) Foreign Application Priority Data

Sep. 11, 2014  (JP) ................. 2014-185431

(51) Int. Cl.
*G06K 15/02* (2006.01)

(52) U.S. Cl.
CPC ................. *G06K 15/1803* (2013.01)

(58) Field of Classification Search
USPC ....................................... 358/1.15
See application file for complete search history.

(56) References Cited

U.S. PATENT DOCUMENTS

| | | | | |
|---|---|---|---|---|
| 6,807,383 B2* | 10/2004 | Kawagoe | ........... | G03G 15/6573 101/2 |
| 8,210,671 B2* | 7/2012 | Mattern et al. | ....... | B41J 2/17593 347/88 |
| 8,228,529 B2* | 7/2012 | Yamada | ............. | H04N 1/00278 358/1.1 |
| 8,441,657 B2* | 5/2013 | Koike | ................ | H04N 1/00915 358/1.1 |
| 2004/0042038 A1* | 3/2004 | Uejo | ...................... | G06K 15/00 358/1.15 |
| 2009/0153892 A1 | 6/2009 | Torii | | |
| 2010/0177345 A1* | 7/2010 | Watanabe | ............. | G06F 3/1205 358/1.15 |
| 2011/0199642 A1* | 8/2011 | Utsunomiya | ...... | G03G 15/5062 358/1.15 |
| 2012/0200886 A1* | 8/2012 | Yamaguchi | ........ | H04N 1/00015 358/1.15 |

FOREIGN PATENT DOCUMENTS

| | | |
|---|---|---|
| JP | 2004-192507 | 7/2004 |
| JP | 2009-146251 | 7/2009 |

OTHER PUBLICATIONS

Abstract and machine translation of JP 2004-192507.
Abstract and machine translation of JP 2009-146251.

* cited by examiner

*Primary Examiner* — Allen H Nguyen
(74) *Attorney, Agent, or Firm* — Fildes & Outland, P.C.

(57) ABSTRACT

There is provided a printer system including a printer apparatus configured to be controlled by a controller having a configuration of which at least a part is different for each client. A printing processor is configured to execute printing processing on a medium. A tray state detector is configured to detect a tray state indicating whether or not there is the medium on a destination tray to which the medium on which the printing processing has been executed is discharged. A printing processing control unit is configured to control whether or not to execute the printing processing in the printer apparatus on the basis of the tray state, when the controller is changed.

8 Claims, 12 Drawing Sheets

| TRAY ID | CONTROLLER ID | JOB ID |
|---|---|---|
| T1 | C1 | J1 |
| T2 | C2 | J2 |
| T3 | C1 | J3 |
| T4 | C1 | J4 |

PRINTER SYSTEM

CROSS-REFERENCE TO RELATED APPLICATIONS

This application is based on and claims priority under 35 U.S.C. §119 from Japanese Patent Application No. 2014-185431 filed on Sep. 11, 2014.

TECHNICAL FIELD

The present invention relates to a printer system.

SUMMARY

According to an aspect of the exemplary embodiments of the present invention, there is provided a printer system comprising a printer apparatus configured to be controlled by a controller having a configuration of which at least a part is different for each client, the printer system comprising: a printing processor configured to execute printing processing on a medium; a tray state detector configured to detect a tray state indicating whether or not there is the medium on a destination tray to which the medium on which the printing processing has been executed is discharged; and a printing processing control unit configured to control whether or not to execute the printing processing in the printer apparatus on the basis of the tray state, when the controller is changed.

BRIEF DESCRIPTION OF THE DRAWINGS

Exemplary embodiments of the present invention will be described in detailed based on the following figures, wherein.

DETAILED DESCRIPTION

Figure 1:
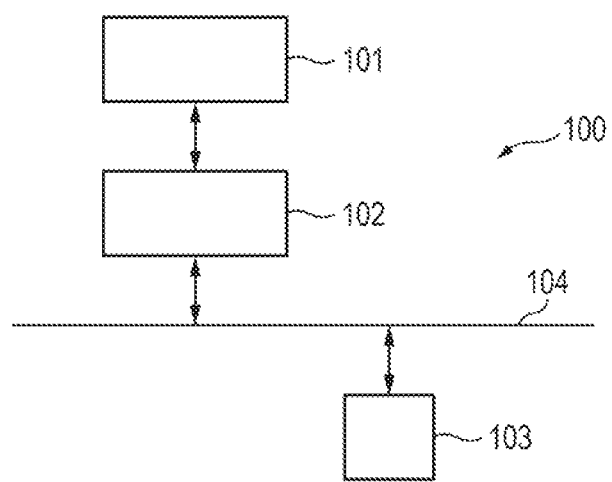
FIG. 1 shows an outline of a configuration of a printer system according to an illustrative embodiment of the present invention.

Hereinafter, illustrative embodiments of the present invention will be described with reference to the drawings. Meanwhile, in the drawings, the same or equivalent elements are denoted with the same reference numerals and the overlapping descriptions thereof are omitted.

FIG. 1 shows an outline of a configuration of a printer system according to an illustrative embodiment of the present invention. The printer system 100 includes a printer apparatus 101, a controller 102, and a terminal apparatus 103. The terminal apparatus 103 is configured to generate print data such as job data and to transmit the same to the controller 102 through a network 104. The controller 102 is configured to control printing processing of the printer apparatus 101 on the basis of the print data transmitted from the terminal apparatus 103. The printer apparatus 101 is configured to perform the printing processing, in response to a control signal from the controller 102.

Figure 2:
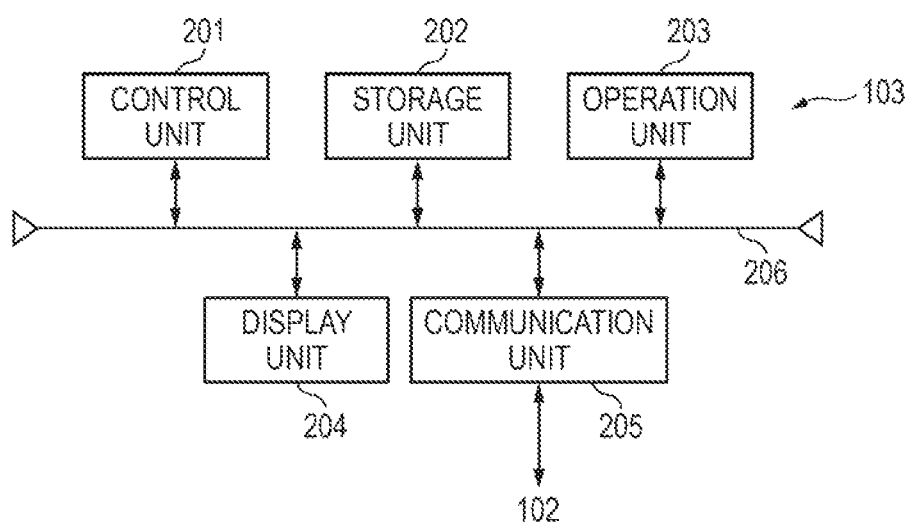
FIG. 2 shows an outline of a configuration of a terminal apparatus.

FIG. 2 shows an outline of a configuration of the terminal apparatus. As shown in FIG. 2, the terminal apparatus 103 includes a control unit 201, a storage unit 202, an operation unit 203, a display unit 204 and a communication unit 205. In the meantime, the respective units 201 to 205 are connected to each other via an internal bus 206.

The control unit 201 is a CPU, for example, and is configured to operate, in response to a program stored in the storage unit 202. The storage unit 202 consists of an information recording medium such as a ROM, a RAM and a hard disk drive, and is an information recording medium configured to store therein a program to be executed by the control unit 201. Also, the storage unit 202 is configured to operate as a work memory of the control unit 201.

In the meantime, the program may be downloaded and provided via the network or may be provided by a variety of computer-readable information recording media such as a CD-ROM and a DVD-ROM.

The operation unit 203 is configured by an interface such as a keyboard, for example, and is configured to output a content of a user's instruction operation to the control unit 201, in response to the user's instruction operation. The display unit 204 is a liquid crystal monitor, an organic EL display and the like, and is configured to display information, in response to an instruction from the control unit 201. The communication unit 205 is connected to the controller 102.

Figure 3:
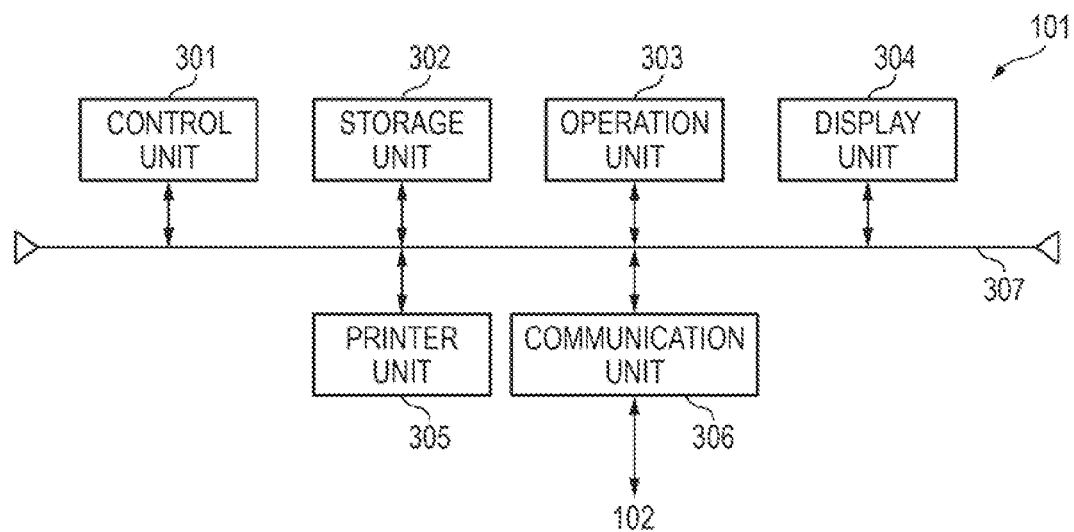
FIG. 3 shows an outline of a configuration of a printer apparatus.

FIG. 3 shows an outline of a configuration of the printer apparatus. As shown in FIG. 3, the printer apparatus 101 includes a control unit 301, a storage unit 302, an operation unit 303, a display unit 304, a printer unit 305 and a communication unit 306. The respective units 301 to 306 are connected to each other via an internal bus 307.

The operation unit 303 is configured by a plurality of buttons and an interface such as a touch panel displayed on the display unit 304, and is configured to output a content of a user's instruction operation to the control unit 301, in response to the user's instruction operation. The display unit 304 is a liquid crystal monitor, an organic EL display and the like, and is configured to display information, in response to an instruction from the control unit 301.

The printer unit 305 is configured to print an image acquired through the controller 102, in response to a control signal from the controller 102. The communication unit 306 is configured to connect the printer apparatus 101 to the controller 102. In the meantime, since the configurations of the control unit 301 and the storage unit 302 are the same as the control unit 201 and the storage unit 202, the descriptions thereof are omitted.

Figure 4:
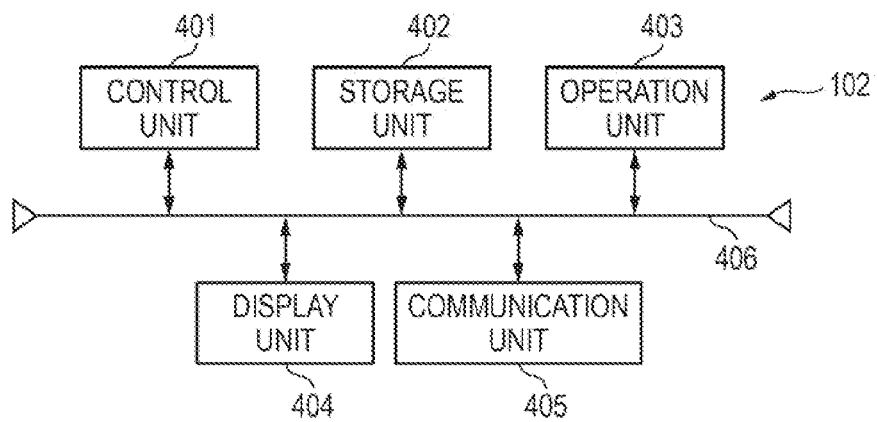
FIG. 4 shows an outline of a configuration of a controller.

FIG. 4 shows an outline of a configuration of the controller. As shown in FIG. 4, the controller 102 includes a control unit 401, a storage unit 402, an operation unit 403, a display unit 404 and a communication unit 405, for example. The respective units 401 to 405 are connected by an internal bus 406. Also, since the configurations of the respective units 401 to 405 are the same as the control unit 301, the storage unit 302, the operation unit 303, the display unit 304 and the communication unit 306, the descriptions thereof are omitted. Also, the configurations of the printer apparatus 101, the terminal apparatus 103 and the controller 102 shown in FIGS. 2 to 4 are exemplary, and this illustrative embodiment is not limited to the above.

Figure 5:
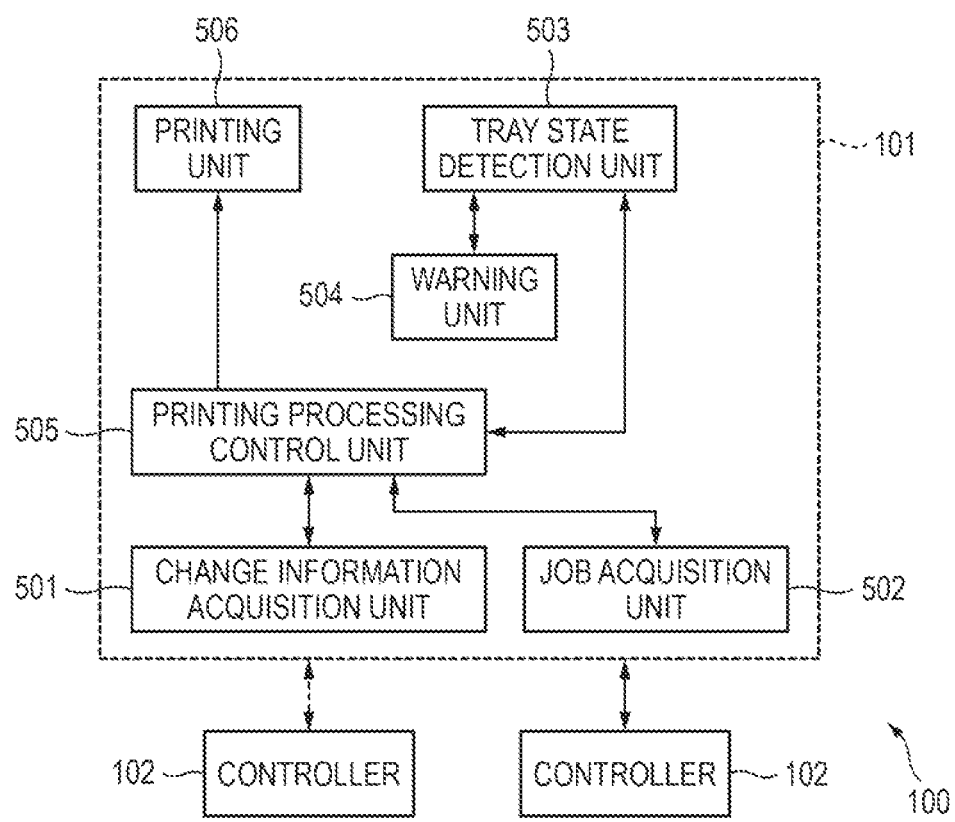
FIG. 5 shows an example of a functional configuration of the printer system according to a first illustrative embodiment.

FIG. 5 shows an example of a functional configuration of the printer system according to this illustrative embodiment. Meanwhile, in the below, a case where the left controller 102 is changed to the right controller 102 is described so as to easily understand the configuration. Also, in FIG. 5, a functional configuration of the terminal apparatus 103 is not shown.

As shown in FIG. 5, the printer system 100 functionally has a change information acquisition unit 501, a job acquisition unit 502, a tray state detection unit 503, a warning unit 504, a printing processing control unit 505 and a printing unit 506. In the meantime, the configuration shown in FIG. 5 is just exemplary and this illustrative embodiment is not limited thereto.

The change information acquisition unit 501 is configured to acquire change information indicating whether the controller 102 is changed. Specifically, when the connection is changed from the left controller 102 to the right controller 102 or when a change from the left controller 102 to the right controller 102 is instructed to the controller 102, for example, the change information acquisition unit 501 acquires the change information. Meanwhile, in this illustrative embodiment, clients allotted to the left controller 102 and the right controller 102 are different. Specifically, in this illustrative embodiment, the controllers 102 having configurations that are partially or entirely different for each client are used to control the one printer apparatus 101.

Figure 6:
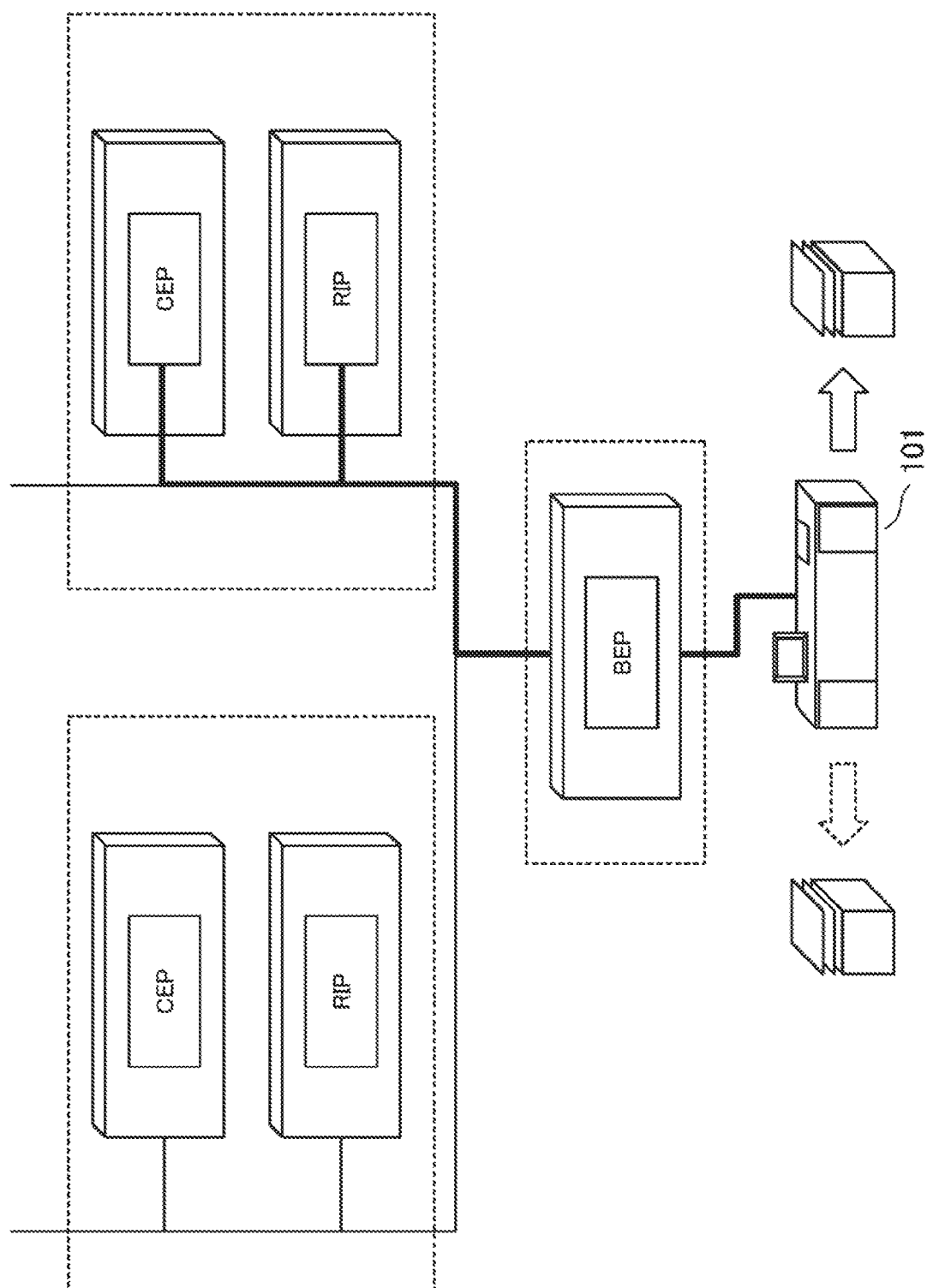
FIG. 6 shows an example of the configuration of the printer system.

More specifically, as shown in FIG. 5, for example, the printer system 100 of this illustrative embodiment may be configured to physically change the controller 102 for each client. Also, as shown in FIG. 6, a part of the configuration of the controller may be changed so that a backend unit (BEP unit (backend processor)) of the controller 102 is commonly used and only a frontend unit (CEP unit (center processor) and RIP unit (raster image processor)) is changed for each client.

Here, the CEP unit is configured to functionally receive and manage job data from the terminal apparatus 103. The RIP unit is configured to generate image data, in accordance with the job data. The BEP unit is connected to the printer apparatus 101 and is configured to control the printer apparatus 101, for example, to output the generated image data to the printer apparatus 101.

Figure 7:
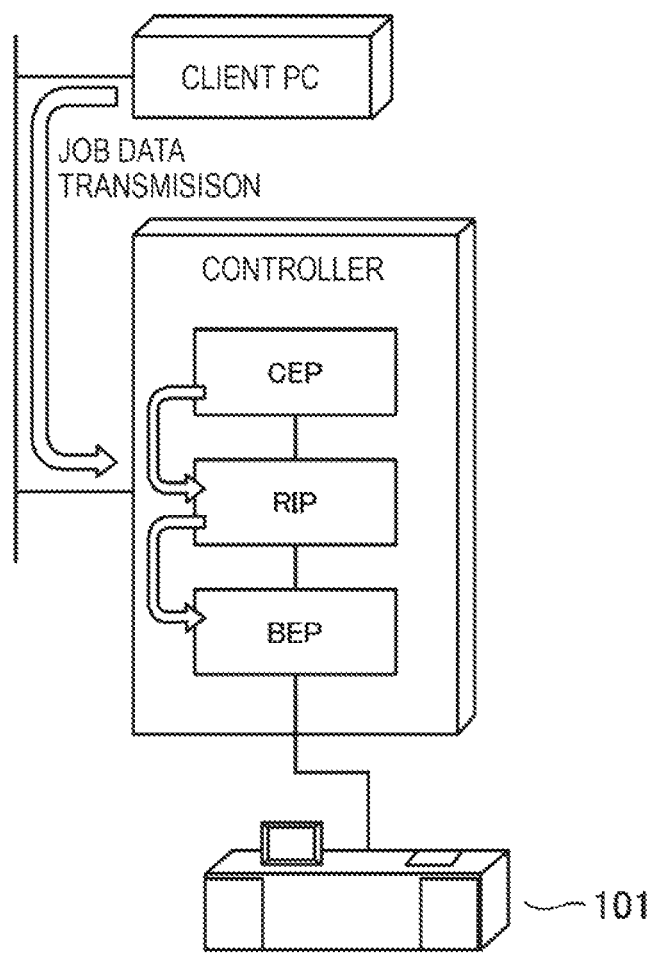
FIG. 7 shows another example of the configuration of the printer system.
Figure 8:
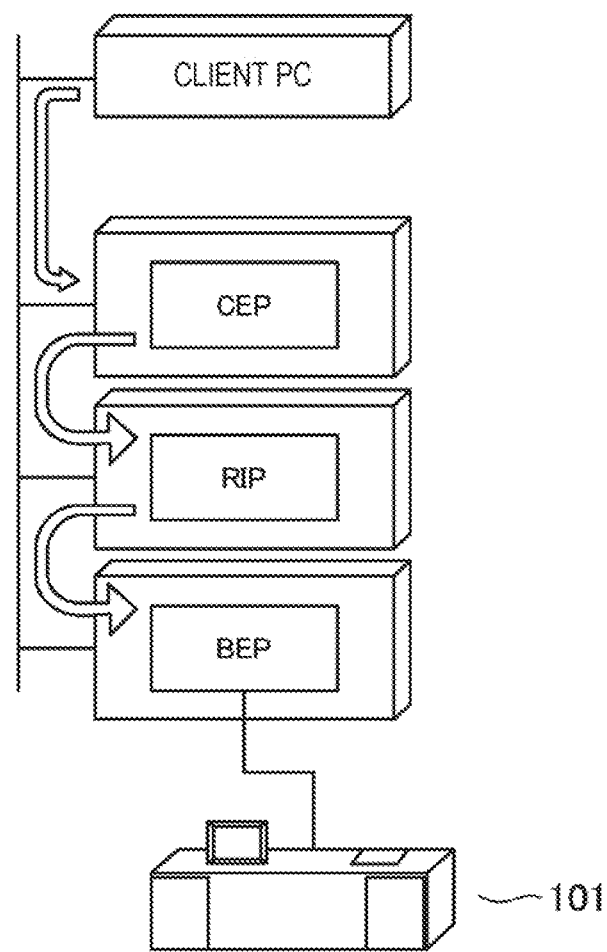
FIG. 8 shows another example of the configuration of the printer system.
Figure 9:
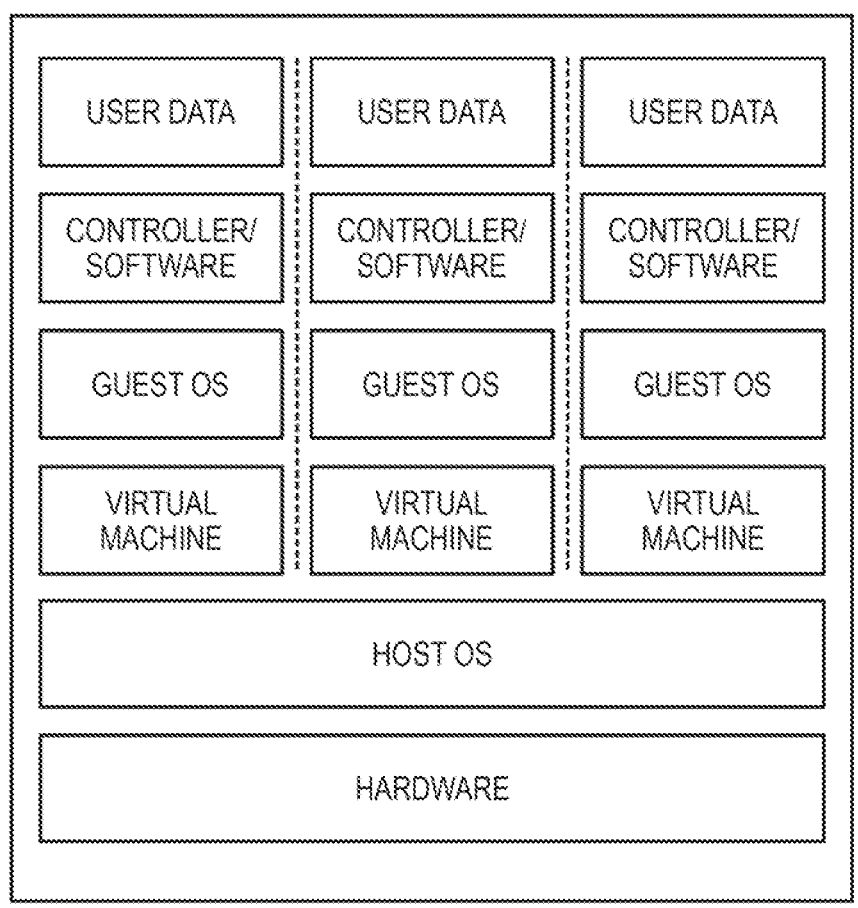
FIG. 9 shows an example of a configuration of a virtualized controller.
Figure 10:
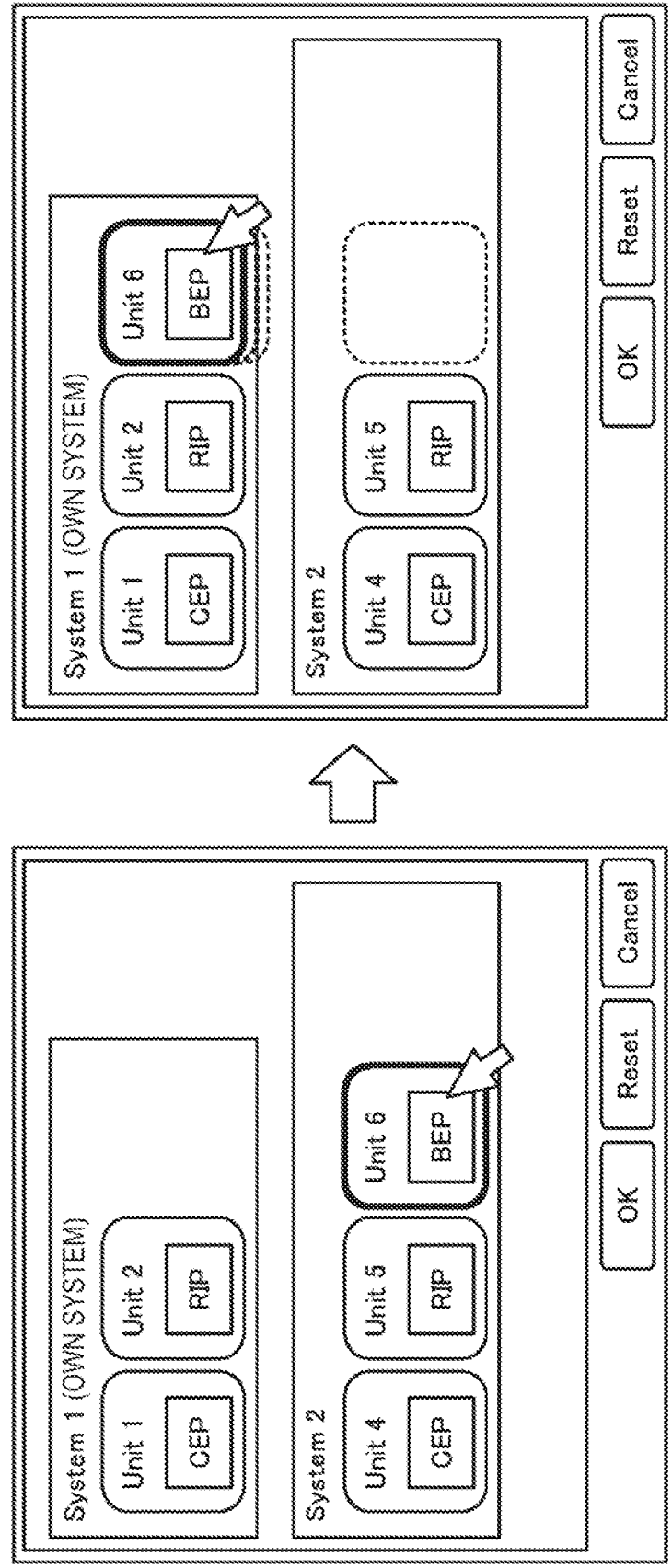
FIG. 10 illustrates an example of a change screen of a controller.

The CEP unit, the RIP unit and the BEP unit may be configured by one hardware, as shown in FIG. 7, or may be configured by separate hardware, respectively, as shown in FIG. 8. Also, as shown in FIG. 9, each controller 102 may be configured as a virtual machine. Also, as shown in FIG. 6, the CEP unit and the RIP unit of the CEP unit, the RIP unit and the BEP unit may be configured as stand-alone hardware and only the BEP may be configured as stand-alone hardware. Also, only the BEP unit may be configured as stand-alone hardware, and some (the CEP unit and the RIP unit) may be configured and used by software for each client with the BEP unit being connected to the printer apparatus 101 by a dedicated interface (cable). In this case, when the controller 102 is configured by a virtual machine, as described above, the CEP unit may be provided with a UI unit (user interface), for example, and an icon indicating the BEP unit as shown in FIG. 10 may be dragged to change the configuration of the controller 102 by a mouse. In the meantime, the left of FIG. 10 indicates a pattern of icons before the drag and the right of FIG. 10 indicates a pattern of icons after the drag. In the meantime, a client PC in FIGS. 7 and 8 corresponds to the terminal apparatus 103, for example.

The job acquisition unit 502 is configured to acquire job data indicating a job relating to the printing processing from the controller 102.

The tray state detection unit 503 is configured to detect a tray state indicating whether there is a sheet on a destination tray of the printer apparatus 101. For the detection of the tray state, a well-known sensor such as a mechanical sensor configured to be pressured by a sheet and to thus detect the sheet, an optical sensor and the like is used. The tray state detection unit 503 may be configured to detect each tray state when the printer apparatus 101 has a plurality of trays, for example.

Figure 11:
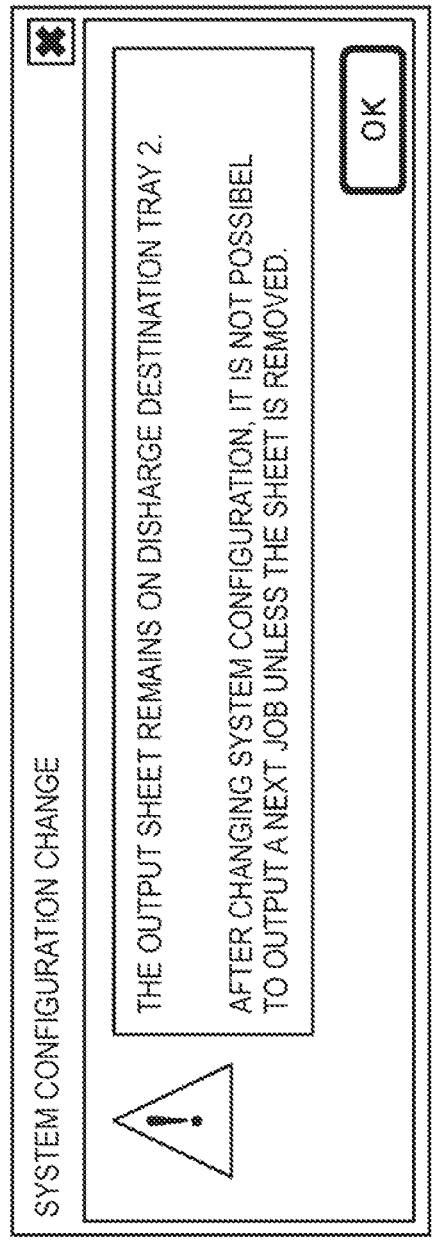
FIG. 11 shows an example of a warning message.

The warning unit 504 issues a warning when the tray state detection unit 503 detects that there is a sheet on the tray. Specifically, as shown in FIG. 11, for example, the warning unit 504 displays a message, which urges a user to remove the sheet remaining on the tray, on the display unit 304 of the printer apparatus 101, the corresponding controller 102 or the corresponding terminal apparatus 103. In the meantime, the warning is not limited to the warning message as described above and other types such as sound warning may also be adopted.

The printing processing control unit 505 controls the printing unit 506 to execute the printing processing based on the job when the tray state detection unit 503 detects that there is no sheet on the tray. That is, for example, when it is determined that there is no sheet on the tray, the printing processing starts. On the other hand, when the tray state detection unit 503 detects that there is a sheet on the tray, the printing processing control unit 505 controls the printing unit 506 not to execute the printing processing. That is, for example, when it is determined that a sheet remains on the tray, the printing processing is enabled not to start or is suspended. In the meantime, the sheet may be any medium for performing the printing processing and the present invention is not limited to the sheet.

The printing unit 506 is configured to execute the printing processing on the medium on the basis of the job data and to discharge the medium, on which the printing processing has been executed, to the destination tray. Specifically, for example, the job data is converted into image data in the RIP unit of the controller 102, as described above, and the printing unit 506 executes the printing processing on the medium, based on the converted image data. The medium, on which the printing processing has been executed, is stacked and maintained on the destination tray.

Meanwhile, in FIG. 5, the case where the controller 102 is changed for each client has been described for convenience of explanations. However, this illustrative embodiment is not limited thereto. For example, as described with reference to FIG. 6, a part of the configuration of the controller 102 may be changed for each client. In this case, for example, the controller 102 may be configured to have a part or all of the configurations of the change information acquisition unit 501, the job acquisition unit 502, the tray state detection unit 503, the warning unit 504 and the printing processing control unit 505. Specifically, for example, the controller 102 may be configured to have the change information acquisition unit 501, the job acquisition unit 502, the warning unit 504 and the printing processing control unit 505.

Figure 12:
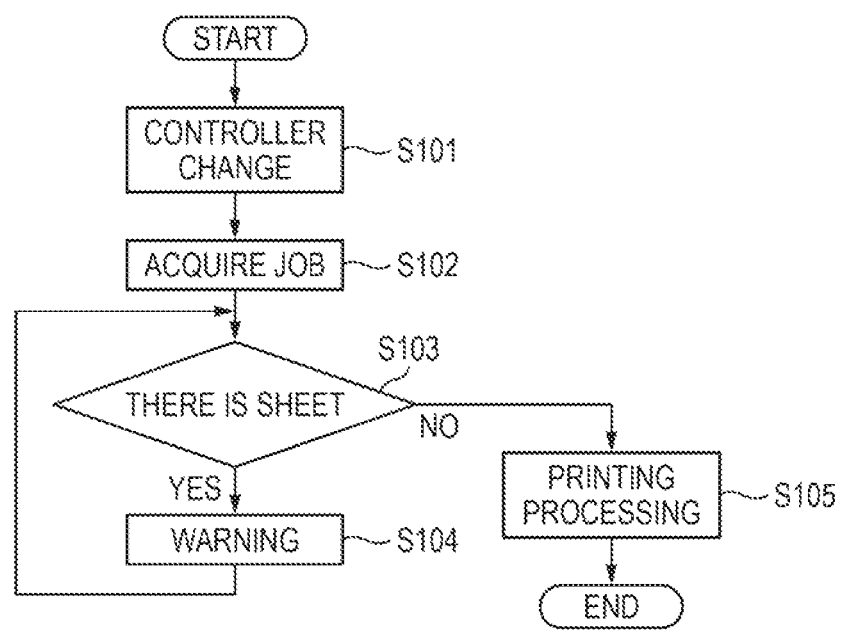
FIG. 12 shows an example of a processing flow of the printer system according to the first illustrative embodiment.

FIG. 12 shows an example of a processing flow of the printer system according to this illustrative embodiment.

As shown in FIG. 12, the change information acquisition unit 501 first acquires change information indicating whether the controller 102 is changed or not (S101). The job acquisition unit 502 acquires a job from the controller 102 (S102). The tray state detection unit 503 detects a tray state (S103). When the tray state detection unit 503 detects that there is a sheet on the tray, the warning unit 504 displays a warning message (S104). Then, the processing returns to S103. When the tray state detection unit 503 detects that there is no sheet on the tray, the printing processing control unit 505 executes the printing processing on the basis of the job (S105). Then, the processing is over.

In the meantime, the above flow is exemplary and this illustrative embodiment is not limited thereto. For example, the orders of S101 and S102 may be reversed.

The present invention is not limited to the above illustrative embodiment and may be replaced with a configuration capable of accomplishing substantially the same configuration, operational effects and purposes as the configuration described in the above illustrative embodiment. For example, in the above illustrative embodiment, the configuration where the printer apparatus 101 has one tray has been mainly described. However, the printer apparatus 101 may have a plurality of trays. In this case, the sheet detection and the like are performed for each tray to which the medium, on which the job has been executed and the printing processing has been executed, is discharged, and the starting of the printing processing and the warning are performed for each tray.

Second Illustrative Embodiment

Subsequently, a second illustrative embodiment of the present invention is described. This illustrative embodiment is different from the first illustrative embodiment, in that job identification information for identifying a job for which the printing processing has been lastly performed is maintained, and when a job acquired as a printing target and a job ID (identification information) are the same, the printing processing of the job is resumed, i.e., the printing processing is executed from the middle. Meanwhile, in the below, the same descriptions as the first illustrative embodiment are omitted.

Figure 13:
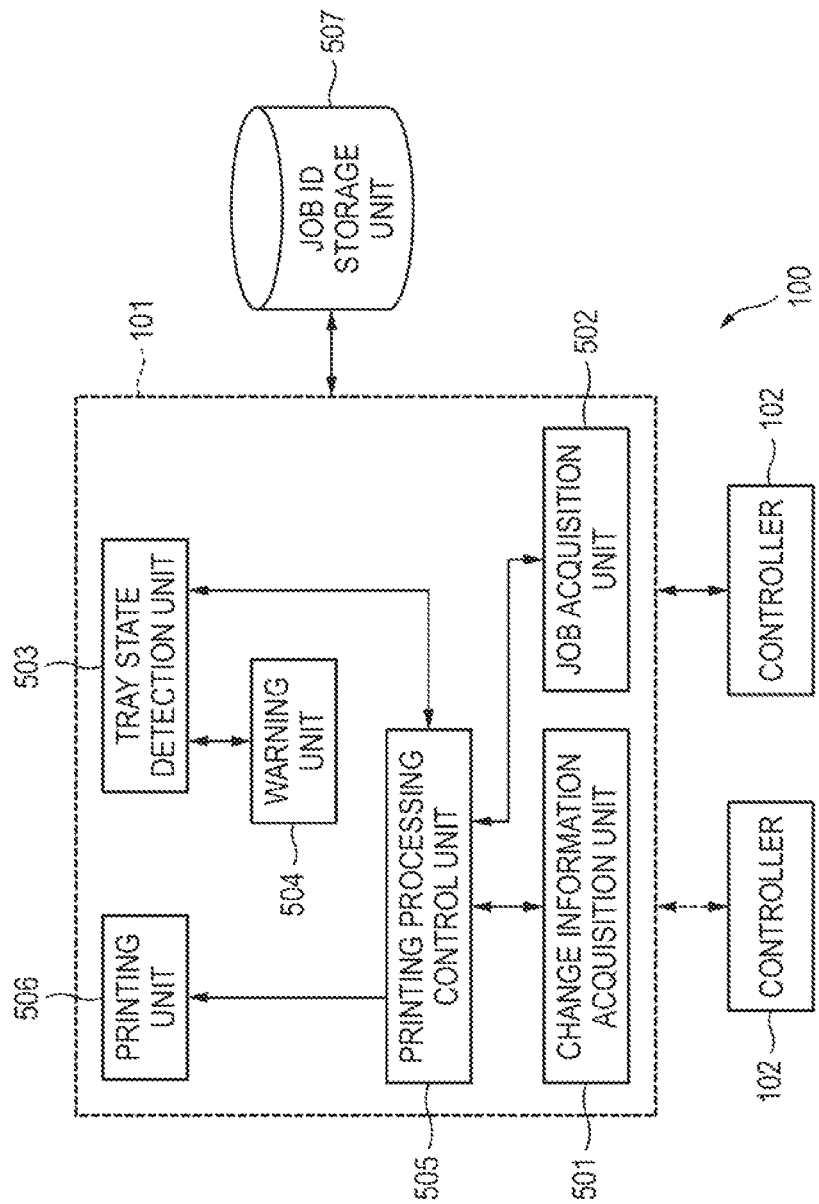
FIG. 13 shows an example of the functional configuration of the printer system according to a second illustrative embodiment.

FIG. 13 shows an example of the functional configuration of the printer system according to this illustrative embodiment. As shown in FIG. 13, the printer system 100 of this illustrative embodiment functionally includes the change information acquisition unit 501, the job acquisition unit 502, the tray state detection unit 503, the warning unit 504, the printing processing control unit 505, the printing unit 506 and a job ID storage unit 507. In the meantime the configuration shown in FIG. 13 is exemplary, and this illustrative embodiment is not limited thereto.

Figures 14, 15:
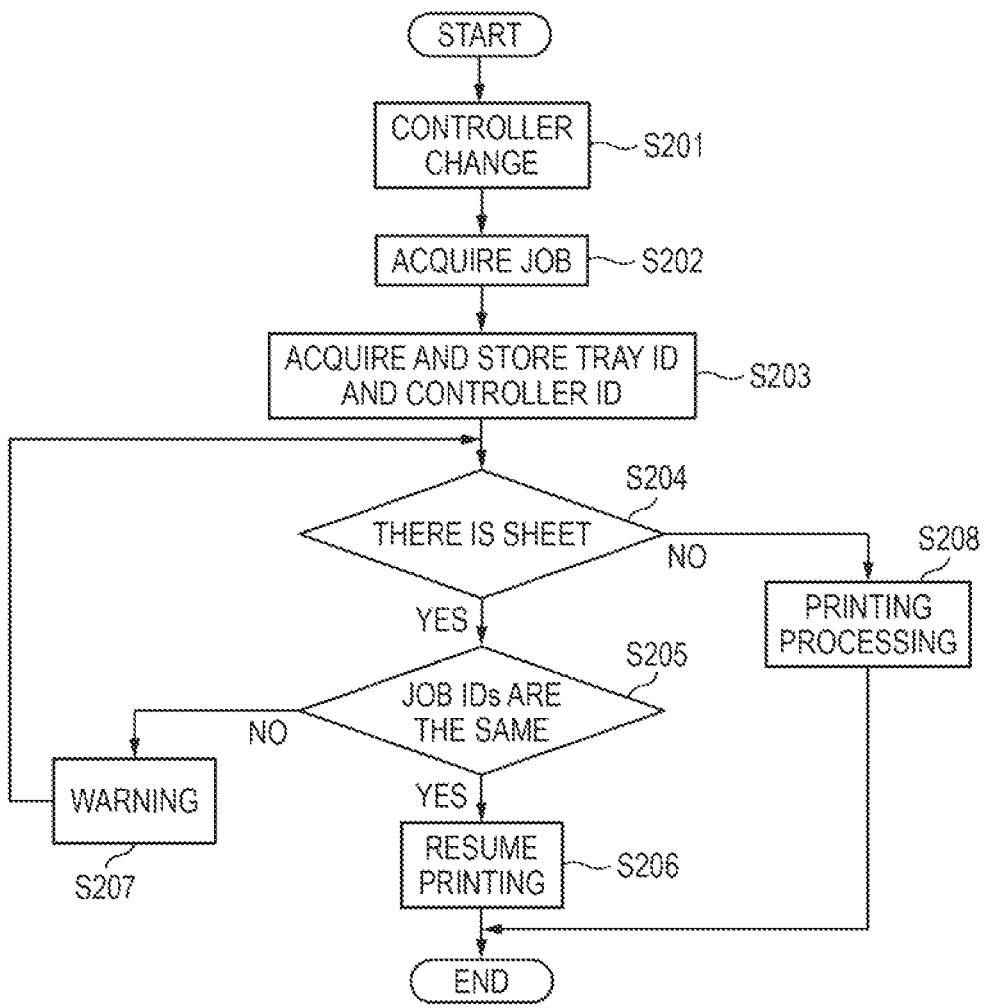
FIG. 14 shows an example of a table stored in a job ID storage unit.
FIG. 15 shows an example of a processing flow of the printer system according to the second illustrative embodiment.

The job acquisition unit 502 is configured to acquire a job ID (identification information) for identifying a job, a tray identification ID for identifying a tray to which a printing processing result by the job is discharged and a controller ID for identifying the controller 102 and to store the same in the job ID storage unit 507, based on the acquired job data. Specifically, for example, as shown in FIG. 14, the job ID storage unit 507 is configured to associate the tray ID, the controller ID and the job ID and to store the same in a table form.

The tray state detection unit 503 is configured to detect a tray state. Here, the tray state detection unit 503 is configured to detect whether there is a sheet, for each tray (for each tray ID). When the tray state detection unit 503 detects that there is a sheet on the tray, the printing processing control unit 505 refers to the job ID storage unit 507 to determine whether the job ID and controller ID acquired by the job acquisition unit 502 are the same as the job ID and controller ID stored in the job ID storage unit 507.

Specifically, for example, in case that the job ID acquired this time by the job acquisition unit 502 is J1 and the controller ID is C1, when the job ID: J1 and the controller ID: C1 are stored in the job ID storage unit 507, as shown in FIG. 14, the printing processing control unit 505 determines that the job IDs are the same. Then, the printing unit 506 is enabled to resume the printing processing. That is, the printing processing is executed from the middle.

On the other hand, when the printing processing control unit 505 determines that the job IDs are not the same, the warning unit 504 issues a warning and the printing processing control unit 505 does not execute the control for enabling the printing unit 506 to start the printing processing. On the other hand, when the tray state detection unit 503 detects that there is no sheet on the tray, the printing processing control unit 505 enables the printing unit 506 to execute the printing processing.

FIG. 15 shows an example of a processing flow of the printer system according to this illustrative embodiment. The change information acquisition unit 501 acquires the change information indicating whether the controller 102 is changed or not (S201). The job acquisition unit 502 acquires a job from the controller 102 (S202). The job acquisition unit 502 acquires a job ID for identifying a job, a tray identification ID for identifying a tray to which a printing processing result by the job is discharged and a controller ID for identifying the controller 102 and stores the same in the job ID storage unit 507, based on the acquired job data (S203). The tray state detection unit 503 detects a tray state (S204).

When the tray state detection unit 503 detects in S204 that there is a sheet on the tray the printing processing control unit 505 refers to the job ID storage unit 507 to determine whether the job ID acquired in S102 is the same as the job ID stored in the job ID storage unit 507 (S205). When it is determined that the job IDs are the same, the printing unit 506 is enabled to resume the printing processing (S206). Then, the processing is over. On the other hand, when it is determined in S205 that the job IDs are not the same, the warning unit 504 issues a warning (S207). Then, the processing returns to S204. On the other hand, when the tray state detection unit 503 detects in S204 that there is no sheet on the tray, the printing processing control unit 505 enables the printing unit 506 to start the printing processing (S208). Then, the processing is over.

In the meantime, the above flow is exemplary and this illustrative embodiment is not limited thereto. For example, the orders of S201 and S202 may be reversed.

The present invention is not limited to the first and second illustrative embodiments and may be replaced with a configuration capable of accomplishing substantially the same configuration, operational effects and purposes as the configuration described in the above illustrative embodiments. For example, the controller 102 may be configured to have a part of the configurations of the change information acquisition unit 501, the job acquisition unit 502, the tray state detection unit 503, the warning unit 504, the printing processing control unit 505 and the job ID storage unit 507, and the printer apparatus 101 may be configured to have the other configurations.

The foregoing description of the exemplary embodiments of the present invention has been provided for the purposes of illustration and description. It is not intended to be exhaustive or to limit the invention to the precise forms disclosed. Obviously many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printer system comprising a printer apparatus configured to be controlled by a controller having a configuration of which at least a part is different for each client, the printer system comprising:
    a printing processor configured to execute printing processing on a medium;
    a tray state detector configured to detect a tray state indicating whether or not there is the medium on a destination tray to which the medium on which the printing processing has been executed is discharged; and
    a printing processing control unit configured to control whether or not to execute the printing processing in the printer apparatus on the basis of the tray state, when the controller is changed.

2. The printer system according to claim 1, wherein the printing processing control unit performs a control of executing the printing processing when the detected tray state indicates that there is no medium on the destination tray.

3. The printer system according to claim 1, wherein the printing processing control unit performs a control of not executing the printing processing when the detected tray state indicates that there is the medium on the destination tray.

4. The printer system according to claim 3, further comprising a warning unit configured to issue a warning when the detected tray state indicates that there is the medium on the destination tray.

5. The printer system according to claim 3, wherein when printing processing based on suspended job data is to be resumed, the printing processing control unit performs a control of resuming the printing processing.

6. The printer system according to claim 4, further comprising a job identification information storage configured to hold job identification information for identifying job data for which the printing processing has been lastly performed,
    wherein the printing processing control unit performs a control of resuming the printing processing when job identification information of job data, which is a current printing target, is the same as the job identification information held in the job identification information storage.

7. The printer system according to claim 1,
    wherein the controller comprises a frontend unit, a data conversion unit configured to convert job data acquired by the frontend unit into image data, and a backend unit, and
    wherein the backend unit of the controller is commonly used for each client.

8. A non-transitory computer readable medium storing a printer system control program for enabling a printer system comprising a printer apparatus configured to be controlled by a controller having a configuration of which at least a part is different for each client, to function as:
    a printing processor configured to execute printing processing on a medium;
    a tray state detector configured to detect a tray state indicating whether or not there is the medium on a destination tray to which the medium on which the printing processing has been executed is discharged; and
    a printing processing control unit configured to control whether or not to execute the printing processing in the printer apparatus on the basis of the tray state, when the controller is changed.

\* \* \* \* \*